United States Patent [19]

Wiech, Jr.

[11] 4,197,118

[45] Apr. 8, 1980

[54] MANUFACTURE OF PARTS FROM PARTICULATE MATERIAL

[75] Inventor: Raymond E. Wiech, Jr., Chula Vista, Calif.

[73] Assignee: Parmatech Corporation, San Rafael, Calif.

[21] Appl. No.: 676,194

[22] Filed: Apr. 12, 1976

Related U.S. Application Data

[63] Continuation-in-part of Ser. No. 497,698, Aug. 15, 1974, abandoned, which is a continuation of Ser. No. 262,851, Jun. 14, 1972, abandoned.

[51] Int. Cl.² .............................................. B22F 1/00
[52] U.S. Cl. ........................................ 75/228; 264/63; 148/105
[58] Field of Search ............... 264/43, 63, DIG. 58, 264/57; 75/0.5 R, 200, 211, 214, 231, 228, 230; 148/103, 105

[56] References Cited

U.S. PATENT DOCUMENTS

| | | | |
|---|---|---|---|
| 2,847,710 | 8/1958 | Pitzer | 264/63 |
| 2,939,199 | 6/1960 | Strivens | 264/63 |
| 3,277,222 | 10/1966 | Vachet et al. | 264/63 |
| 3,423,216 | 1/1969 | Somers | 264/63 |
| 3,728,110 | 4/1973 | Klar et al. | 75/0.5 R |
| 3,901,742 | 8/1975 | Facaros | 148/105 |

*Primary Examiner*—L. Dewayne Rutledge
*Assistant Examiner*—John P. Sheehan
*Attorney, Agent, or Firm*—Jay M. Cantor

[57] ABSTRACT

The disclosure relates to a method of binder removal from a green body before sintering or the like wherein the green body is initially heated to a temperature above the flow point of the binder to liquify the binder and, at this elevated temperature, surrounded by a solvent for said binder in the vapor phase and at a temperature slightly above the melting point of the binder. The solvent vapor enters the green body slowly and dissolves the binder therein so that excessive stresses are not provided within the body due to binder expansion until binder-solvent substantially ceases to exude from the body. The body is then placed in a bath of the solvent, the solvent being maintained at a temperature above the flow point of the binder to remove remaining binder from the body.

63 Claims, 2 Drawing Figures

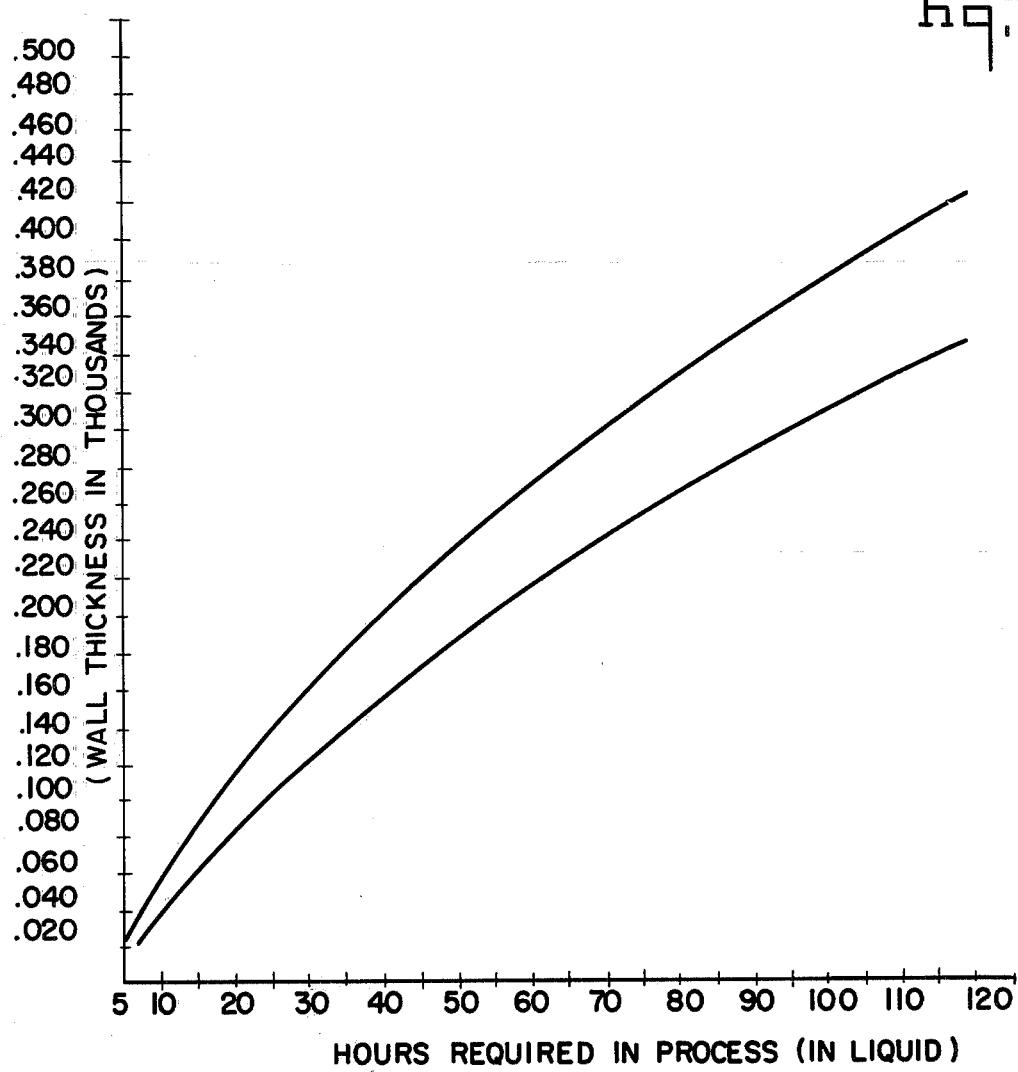
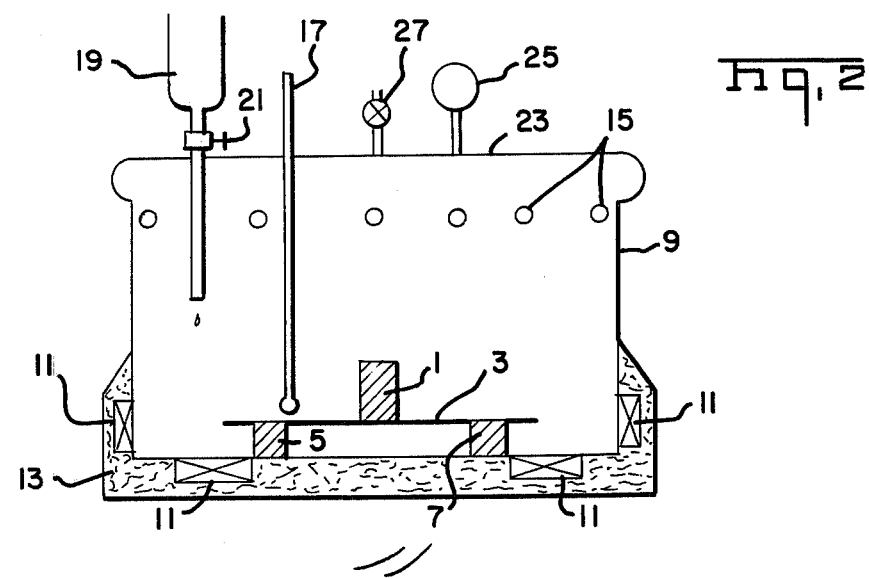

MANUFACTURE OF PARTS FROM PARTICULATE MATERIAL

This application is a continuation-in-part of my co-pending application Ser. No. 497,698, filed Aug. 15, 1974, which is a continuation of application Ser. No. 262,851, filed June 14, 1972, both now abandoned.

BACKGROUND

The art of forming shaped articles from particulate mixtures is well known in the art. Classically, a desired particulate material is mixed with a binder and then formed into the desired shape, this being called a green body. The green body is then fired to provide a fusion of the particulate material and to drive off the binder, thereby producing the desired shaped product with proper surface texture, strength, etc.

In the production of shaped objects in the manner above described, it has been found that the binder is a necessary evil. It must be used in order to form an object of practical use, but it also must be removed before the part can be sintered.

The prior art has recognized this problem and has therefore attempted to remove binder from the shaped green body prior to the step of firing. Examples of such prior art are shown in the patent to Strivens U.S. Pat. No. 2,939,199 as well as in British patent No. 808,583. While systems using the procedures described in the above noted patents can provide advantages over prior art procedures wherein removal of the binder prior to firing was not utilized, articles formed in accordance with the teachings of these prior art patents still have the tendency to crack during the binder removal as well as during the firing operation. The reason for this is that the binder is removed from the green body by means of a solvent when the binder is in the solid state. It is known that when the binder and the solvent are mixed together, the binder-solvent mixture has a tendency to expand. Since the binder is in the solid state, it can not readily move within the green body and the expansion within the green body can become greater than the van der Waals forces holding the particulate material together. This will cause the cracking which is then further accentuated in the final firing step if the article is even capable of somewhat retaining its shape.

BRIEF DESCRIPTION OF INVENTION

This cracking and breakage of the prior art is substantially overcome in accordance with the present invention. Briefly, the green body is heated to a temperature at or above the flow point of the binder and the solvent is then introduced into the green body very slowly in the vapor phase. The binder-solvent combination will expand as in the prior art. However, since the binder has been heated to at least its flow point, the pressures formed within the green body by the expansion of the binder-solvent combination is eased by the movement of this solvent-binder combination through the interstices of the green body. In this manner, a substantial part of the binder material can be removed without any possible cracking or rupturing within the green body. The attractive forces, such as van de Waals forces which hold the particulate material together in the green body must be maintained at the same or a greater strength than the swelling forces by regulating the addition of the binder-solvent material due to the slow introduction of solvent. Since all of the binder material is not removed in the vapor phase, the green body is then placed totally within a bath of the liquid solvent material wherein the solvent material has been heated to a temperature above the flow point of the binder, thereby allowing most of the remainder of the binder to be removed. There will again be no cracking or rupturing since the space provided by the interstices within the green body will accommodate by diffusion the almost complete removal of binder materials. A preheat step can now be used to remove any remaining binder and any remaining solvent by solvent evaporation or the like from the green body. The green body with substantially all binder removed is then fired or sintered in standard manner to provide the completed shape.

OBJECTS OF THE INVENTION

It is therefore an object of this invention to provide an improved method of forming articles from particulate metal and ceramic materials.

It is another object of this invention to provide a method for removing binder from a green body wherein the binder is heated to at least its flow point prior to solvent extraction.

It is a yet further object of this invention to provide a method wherein binder is extracted from a green body wherein the binder is heated to at least its flow temperature and the solvent is applied in the vapor phase.

It is a still further object of this invention to provide a method for removing binder from a green body wherein the binder is heated to at least its flow point and solvent is then applied in the vapor phase at a rate sufficiently slow whereby the binder can dissolve therein and pass out of the green body through the interstices at a rate sufficient to prevent rupture of the body due to swelling of binder and solvent combinations whereby attractive forces between particles in the green body are not overcome by the swelling forces.

The above objects and still further objects of the invention will immediately become apparent to those skilled in the art after consideration of the following preferred embodiments thereof, which are provided by way of examples and not by way of limitations, wherein:

DESCRIPTION OF DRAWINGS

FIG. 1 is a chart showing processing time in liquid solvent as a function of wall thickness of the green body; and FIG. 2 is a schematic diagram of apparatus used for solvent extraction.

DETAILED DESCRIPTION OF INVENTION

At the outset, it should be understood that while the discussion of the specific embodiments of the invention will be provided mainly with reference to ceramics, the invention also applies to plastics, metals, alloys, cermets and any other area wherein particulate materials can be held together with a binder and then fused after binder removal by the application of heat thereto. In the manufacture of precision parts, particularly those made of metal or ceramic, it has been necessary in the prior art that these parts undergo precision machining operations in order to provide the final article or product within the close tolerances required. In accordance with the prior art, such precision articles could not usually be formed directly from particulate materials in accordance with classical injection molding techniques with commercial yields or with any degree of reliability especially when the cross section thickness exceeds several millimeters. The reason why precision parts could not be formed from particulate materials in the past has been due to the large degree of shrinkage as well as to the very high breakage rate encountered except when extremely long periods of solvent extraction were used. These periods were of such length as to make them unfeasible in a commercial sense. In accordance with the present invention these materials can now be molded directly from particulate material to provide the precision finished product without the necessity of machining or other costly processing steps. This materially reduces the costs of forming such precision materials and parts.

The processing steps in forming an article in accordance with the method of the present invention are (1) material selection, (2) mixing, (3) molding or fabrication, (4) stripping, (5) low temperature burn and (6) sintering.

The starting material is basically the particulate material which is to form the final product and a binder. Other materials, if desired, such as an anti-oxidant, a defloculant or the like can also be added. It is desired that the material from which the final article is to be formed be formed of particles of preferably spherical shape with diameters as small as possible and a relatively substantial particle size range. This will permit the maximum packing density wherein the space between adjacent larger particles can be filled with smaller particles of the same material to provide this maximum packing density. It is preferred that the maximum particle size be about 4 microns with an average particle size of 1 micron or less. A binder is added which has a flow point substantially below the sintering temperature of the materials which form the ultimate article. More than one binder, each binder with a different flow point, can be utilized for reasons as will be explained hereinbelow. The amount of binder required, at a minimum, is that which would be necessary to coat all of the particles of the particulate material. As a maximum, the amount of binder utilized would be that necessary to fill all of the interstices between the particles of particulate material and be inert relative thereto during the processing steps that take place. It is preferred that 65 to 70% particulate material and the remainder binder be utilized, the greater the ratio of particulate material to binder the better so long as all of the particles are coated with binder material. Systems using as little as 40% particulate material and as much as 90% particulate material have been successfully employed.

The combination of particulate material and binder is then mixed by standard methods to provide a substantially homogeneous material and also to provide for the coating of all of the particles with the binder material. The mixing step also breaks up agglomerates of material to allow for the coating of substantially all of the particulate material with the binder. The agglomerates are normally formed from the small particles and this is due to their tendency to cling together because of the relatively higher surface forces present on the smaller particles relative to the larger particles.

The mixture of binder and particulate material is then fed into a mold to provide a green body. Injection molding is the most commonly used method of molding though extrusion, vacuum forming, blow molding or any prior art molding techniques could be used. The molding techniques used herein are those used in the prior art and do not form a part of the invention in and of themselves.

The stripping operation involves the removal of a large portion of the binder from the green body which has been formed in the molding step. It is desired that the maximum amount of binder be removed during the initial stripping process but that enough binder remain to prevent collapse or cracking of the green body. In the case of a one component binder, the green body will be placed in a container and heated to at least the flow point of the binder whereby the binder is in a flow or liquidus state. A solvent for the binder is then entered into the chamber in the gaseous state, the solvent preferably having a boiling point above the flow point of the binder. The solvent is entered into the chamber at a rate sufficiently slow so that the swelling caused by the combination of solvent and binder is not sufficient to overcome the attractive forces which hold the particles of the green body together. This means that the exudation of the solvent-binder combination from the green body must take place at substantially the same rate or a greater rate than the formation of new swelled solvent-binder combinations within the green body. The introduction of solvents in the gaseous space continues until the chamber, which was originally substantially evacuated, begins to show some solvent in the liquid phase. The amount of time required for this step will depend upon several facts, including the size and geometry of the green body, the particular solvent utilized, the particular binder utilized, etc. A preferred time period for addition of solvents in the gaseous phase would be that determined by initially evacuating the chamber and then adding the solvent over a period of one hour in a somewhat linear manner so that the chamber shows a pressure of about 30 inches of mercury at the end of the one hour period. At the end of the operation of binder removal by gaseous solvents, a substantial part of the binder will have been removed, thereby creating passages of increased permeability in the interstices between the particles of the green body. The green body is then placed in a liquid solution of the solvent at a temperature at or above the flow point of the binder whereby substantially all of the remaining binder is removed. It should be understood that some binder and solvent may and probably will remain and this will be handled in a manner to be disclosed hereinbelow. The time required for the removal of the remaining binder in the bath of liquid solvent depends upon wall thickness and geometry of the green body. The time is a function of wall thickness as set forth in the chart of FIG. 1.

While the combination solvent-binder will cause an expansion within the interstices of the green body in the same manner as in the prior art as set forth hereinabove, there will be no cracking or rupturing of the green body because the amount of binder remaining is sufficiently small so that the passages in the interstices are large enough to handle the expansion and permit exudation of the remaining binder, with or without solvent, into the liquid solvent system.

The green body is then removed from the solvent system and, though substantially devoid of binder, still includes some binder which may have remained or which may have combined with the solvent and not have been leached from the green body. This remaining binder and solvent, if any, is now removed by a low temperature burn. Such low temperature burns are well known in the prior art. The low temperature burn would typically involve placing the part in an over and raising the temperature to a point slightly above the boiling point of the solvent for an extended period, preferably at least one hour, to remove all remaining solvent from the green body. The temperature is then raised to a temperature of 212° F. for about one to two hours to remove any water which may possibly have entered into the green body. The temperature is then raised to the removal temperature of the binder, whether by oxidation, reduction, evaporation, etc. and then the temperature is slowly increased to the vicinity of 600° to 800° F. for a period of about three days. The temperature and time vary according to the particular material being used and the binder system employed. This three day period will also vary in accordance with the wall size of the green body in substantially the same ratio as shown in the chart in FIG. 1 for binder removal. The slow temperature burn, if desired, can take place at lower temperatures for delicate parts with the final burn out taking place during the sintering operation. Also, the temperature would always be below the sintering temperature of the green body particles.

The sintering operation is standard and in accordance with prior art sintering techniques. In the case of a metallic green body, a reducing or neutral atmosphere is usually used within the kiln and, in the case of an oxide ceramic green body, an oxidizing atmosphere is utilized. After proper sintering in the kiln in accordance with standard techniques, the final articles is produced and removed from the kiln.

The articles provided in accordance with the above disclosed steps have been found to undergo a shrinkage of calculable amount and to be relatively free of cracks and the like. Precision articles have been formed from metals, ceramics and cermets and have been found to be reproduceable with substantially high yields.

Also, since the binder material is quite expensive relative to many of the particulate materials used in most cases, it is now possible to recycle the solvent-binder system remaining and to separate both binder and solvent for re-use.

Whereas the above discussion has been presented in terms of a single component binder, it has been found desirable, under certain conditions, to use a two-component binder for the following reason. As discussed above, a binder is added to the particulate mixture to improve the formation characteristics of the green body; the binder providing particle adherence, flow-ability, ductility, lubrication, etc. When this binder is removed by leaching, as described above, the resulting green body is still in its original physical configuration having, in general, retained its size, shape dimensions, etc. However, the leached green body has lost the weight of the leached out binder; and is more fragile, since at least some of the adhesive qualities introduced by the binder have been removed.

In order to improve the handling characteristics of the leached out green body, the original binder may incorporate a second binder component that is not leached out and thus may provide improved handling characteristics for the leached green body.

It has been found that, in many cases, the leachable portion of the binder may be cotttonseed or a soybean oil (the non-leachable portion being polyethylene), in which case the leaching agent may be typically Freon TF. The use of these materials has the advantage that the leachable portion of the binder is already in its liquid state at room temperature. The leaching agent for the oil is applied initially in gaseous state and then as a liquid as in the one component binder system. Therefore, no heating, or only modest heating, it necessary for the binder removal operation. By using a binder and a leaching agent such as these, the leaching process may even take place at room temperature. After the indicated leaching process, the leached green body still contains the second non-leached binder component, and may now be handled more readily, i.e., may be stored, stacked, exposed to further shaping processes, etc. This second binder component is ordinarily of the organize type that decomposes under heat, so that it may be removed during the firing operation. The ratio of binders is preferably such that only sufficient non-leachable binder remains to prevent deformation of the green body.

For other applications, it may be desirable to use a three component binder wherein the two binder components are each leachable by a different solvent. Thus a first predetermined temperature and solvent would be used for leaching out the first binder component and a second predetermined temperature and solvent would be used for leaching out the second binder component. The subsequent firing operation, as indicated above, would remove the third binder component. Thus a binder with a number of different components may be used.

In such a three-component binder, the first binder component thereof may advantageously be polyethylene glycol, polypropane glycol, or polyvinyl alcohol—all of these using water as a solvent. The second binder component of the three-component binder may advantageously be polystyrene, which may use methylene chloride as a solvent—or may be dioctyl phthalate, which uses Freon FT as its solvent. The third binder component may be one of the usual strengthening components such as polyethylene which is decomposed by the firing operation.

Another useful three component binder may comprise an oil, a wax, and polystyrene.

It is readily apparent that any number of binder compounds can be used, applying the above principles.

ADDITIVES

In some cases, it may be desirable to use a given additive material to fill all or part of the space originally occupied by a binder component, such a situation arising, for example, when it is desired to control an electrical characteristic, to adhere a metallic film that is to serve as a basis for later metallizing, etc.

This result may be readily achieved by using the desired material to fill the vacant space due to the leaching out of the green body using any of the well-known techniques (such as vacuum deposition or the like).

EXAMPLE I

In one fired particle process, a particulate mixture of ninety percent Bayer process alumina, and five percent talc and five percent Kaolin as a flux was ball milled to achieve the desire ultimate particle size and particle size gradation. The alumina had an average particle size of 0.6 micron and a particle size range from about 3 microns to about 0.2 micron though some particles above and below this range were no doubt present. The mix was isostatically pressed at a pressure of 800 psi into a bar form by placing the mix in a latex bag and exposing it to hydraulic pressure; the uniform hydrostatic pressure forcing the bag/mix into a bar-like shape. The bar was vacuum impregnated with Carnauba wax to provide the green body.

An industrial vapor degreaser as shown in FIG. 2 was utilized wherein the green body 1 was placed upon a cardboard blotter 3, the blotter being positioned on supports 5 and 7 to maintain it above the floor of container 9. A heating tape 11 surrounds the container 9 for providing heat therein, an insulation 13 surrounds the container and tape. A set of cooling coils 15 is positioned at the upper surface of the container to condense volatiles back into the container. A thermometer 17 is positioned adjacent the cylinder 1 to provide a reading of the temperature in container 9 and a dropping funnel 19 with a valve 21 is provided for the addition of solvent. The funnel 19 contains trichloroethylene. A cover 23 is positioned on the container tightly, the cover being air tight to hold a vacuum in the container. A pressure meter 25 is positioned in cover 23 with a valve 27 provided for evacuation of the container 9 in standard manner.

The temperature in container 9 was raised to 100° C. and then to 88° C., this being about the melting range of the Carnauba wax so that the wax was in the liquid state. The container was then evacuated to 15 microns of Hg. The trichloroethylene was then dripped into the container over a period of one hour and volatilized, there being no liquid on the floor of the container. After about 15 minutes, a liquid started to exude from the body 1 and collect on the blotter 3. After one hour the pressure was at 30 inches of Hg and liquid solvent from funnel 19 started to collect and this was allowed to continue until the liquid solvent was above the upper surface of cylinder 11, the solvent being maintained at 88° C. in the liquid state for two hours. The sample 1 was then removed from container 9 and dried.

The sample was found to be free of cracks and to have had substantially all of the Carnauba wax binder leached from the sample. The sample was then heated in a heater to 88° C. to remove solvent for one hour, the temperature was then raised to 100° C. for one hour to remove any water. The temperature was then slowly raised to 250° F. in one hour to burn off any remaining solvent. The leached sample was then kiln fired in an air atmosphere at 2800° F. for one hour and then cooled, the heating and cooling cycle taking 24 hours, eighteen hours of which were to reach the 2800° F. sintering temperature. The resultant product was found to have an excellent density and other characteristics with no cracks.

EXAMPLE II

A particle mixture as in Example I was prepared, this one having a binder of about fifty percent of Carnauba wax and fifty percent low density polyethylene. A green body of this mixture was leached, provided with a slow burn and sintered as described above with excellent results.

Examples I and II were repeated using mild steel particles of substantially the same size and range with all steps being identical except that sintering took place in a reducing atmosphere and the kiln was heated to 2150° F. The same results as stated above were obtained.

The binders may be much more expensive than the particulate materials; and in the prior art processes, these relativerly expensive binder materials were lost because of their decomposition by the heating operation. In the present method, as disclosed above, the relatively expensive binder is leached out of the green body by a leaching agent and remains in the leaching agent—from where it may be salvaged if so desired. This salvage operation is economically feasible.

Though the invention has been described with respect to specific preferred embodiments thereof, many variations and modifications will immediately become apparent to those skilled in the art. It is therefore the intention that the appended claims be interpreted as bradly as possible in view of the prior art to include all such variations and modifications.

What is claimed is:

1. The method of producing a fired particulate configuration, whereby binder material is removed from the particulate configuration prior to firing without swelling the particulate configuration and consequent imparting of shear or tensile force to the particulate configuration prior to the firing thereof, comprising the steps of:
   (1) mixing together predetermined amounts of particulate material and a binder at a temperature above the melting point of the binder wherein the binder hardens upon cooling and can thereafter be melted by heating,
   (2) forming said mixture from (1) into the desired configuration with heat and pressure and then causing said binder to be hardened by cooling,
   (3) heating said formed mixture of (2) to a temperature above the melting point of said binder to liquify said binder in the absence of solvent from the binder,
   (4) placing said heated formed mixture of (3) in a vapor of a solvent for said binder at a temperature above the melting point of said binder whereby said binder dissolves in said solvent for a time sufficient to cause exudation of combined solvent and binder from said mixture without rupture of said configuration,
   (5) placing said formed mixture from (4) in a bath of a liquid solvent for said binder maintained at a temperature above the melting point of said binder, whereby said binder is substantially completely stripped from said formed mixture, and
   (6) sintering said stripped and formed mixture from (5).

2. The method of claim 1 wherein the particulate material is taken from the class consisting of ceramics, metals and cermets.

3. The method of claim 1 wherein the particulate material has a substantial particle size range of about 4 microns and under.

4. The method of claim 2 wherein the particulate material has a substantial particle size range of about 4 microns and under.

5. The method of claim 1 wherein the particulate material has an average particle diameter of about 1 micron.

6. The method of claim 4 wherein the particulate material has an average particle diameter of about 1 micron.

7. The method of claim 3 wherein said particles are substantially of spherical shape.

8. The method of claim 4 wherein said particles are substantially of spherical shape.

9. The method of claim 5 wherein said particles are substantially of spherical shape.

10. The method of claim 6 wherein said particles are substantially of spherical shape.

11. The method of claim 1 wherein the ratio of particulate material to binder is 7:3 or greater.

12. The method of claim 2 wherein the ratio of particulate material to binder is 7:3 or greater.

13. The method of claim 3 wherein the ratio of particulate material to binder is 7:3 or greater.

14. The method of claim 4 wherein the ratio of particulate material to binder is 7:3 or greater.

15. The method of claim 5 wherein the ratio of particulate material to binder is 7:3 or greater.

16. The method of claim 6 wherein the ratio of particulate material to binder is 7:3 or greater.

17. The method of claim 7 wherein the ratio of particulate material to binder is 7:3 or greater.

18. The method of claim 8 wherein the ratio of particulate material to binder is 7:3 or greater.

19. The method of claim 9 wherein the ratio of particulate material to binder is 7:3 or greater.

20. The method of claim 10 wherein the ratio of particulate material to binder is 7:3 or greater.

21. The method of producing a fired particulate configuration, whereby binder material is removed from the particulate configuration prior to firing without swelling the particulate configuration and consequent imparting of shear or tensile force to the particulate configuration prior to the firing thereof, comprising the steps of:
   (1) mixing together predetermined amounts of particulate material and a binder whereby the binder covers substantially all of the surfaces of the particles of said particulate material,
   (2) forming said mixture from (1) into the desired configuration,
   (3) heating said formed mixture of (2) to a temperature above the flow point of said binder to liquify said binder in the absence of solvent from the binder,
   (4) placing said heated formed mixture of (3) while said binder is liquified in a solvent for said binder at a temperature above the flow point of said binder whereby said binder dissolves in said solvent at a sufficiently slow rate to cause exudation of combined solvent and binder from said mixture at a rate greater than the formation of new combined solvent and binder in said formed mixture to prevent rupture of said configuration, and
   (5) sintering said mixture from (4).

22. The method of claim 21 wherein said solvent in step (4) is provided in its vapor phase.

23. The method of claim 22 wherein placing said formed mixture from (4) is a bath of liquid solvent for said binder maintained at a temperature above the melting point of said binder, whereby said binder is substantially completely stripped from said formed mixture.

24. The method of claim 23 wherein the particulate material is taken from the class consisting of ceramics, metals and cermets.

25. The method of claim 23 wherein the particulate material has a substantial particle size range of about 4 microns and under.

26. The method of claim 24 wherein the particulate material has a substantial particle size range of about 4 microns and under 27. The method of claim 23 wherein the particulate material has an average particle diameter of about 1 micron.

28. The method of claim 26 wherein the particulate material has an average particle diameter of about 1 micron.

29. The method of claim 25 wherein said particles are substantially of spherical shape.

30. The method of claim 26 wherein said particles are substantially of spherical shape.

31. The method of claim 27 wherein said particles are substantially of spherical shape.

32. The method of claim 28 wherein said particles are substantially of spherical shape.

33. The method of claim 23 wherein the ratio of particulate material to binder is 7:3 or greater.

34. The method of claim 24 wherein the ratio of particulate material to binder is 7:3 or greater.

35. The method of claim 25 wherein the ratio of particulate material to binder is 7:3 or greater.

36. The method of claim 26 wherein the ratio of particulate material to binder is 7:3 or greater.

37. The method of claim 27 wherein the ratio of particulate material to binder is 7:3 or greater.

38. The method of claim 28 wherein the ratio of particulate material to binder is 7:3 or greater.

39. The method of claim 29 wherein the ratio of particulate material to binder is 7:3 or greater.

40. The method of claim 30 wherein the ratio of particulate material to binder is 7:3 or greater.

41. The method of claim 31 wherein the ratio of particulate material to binder is 7:3 or greater.

42. The method of claim 32 wherein the ratio of particulate material to binder is 7:3 or greater.

43. The process of claim 21 wherein said binder is composed of at least two components, each of said components not being soluble in the same extraction solvent.

44. The process of claim 23 wherein said binder is composed of at least two components, each of said components not being soluble in the same extraction solvent.

45. The method of producing an article comprising the steps of:
   mixing particulate material and a thermoplastic binder until substantially all of the surfaces of the particles of said particulate material are covered with said binder to form a mixture;
   forming said mixture into a desired configuration;
   heating said configuration to cause said binder to be liquidus;
   removing said liquidus binder by application of a solvent to said binder while said binder is liquidus, at a temperature above the flow point of said binder, and subsequently sintering the substantially binder-free configuration.

46. The combination recited in claim 45, wherein said solvent is applied as a vapor.

47. The combination recited in claim 45, wherein after application of said solvent, and prior to sintering, said article is subjected to a burn-out step to remove one or more of solvent, water and binder.

48. The method of producing a fired particulate product comprising the steps of:
   (1) mixing together predetermined amounts of particulate material and a liquid binder which hardens upon cooling until substantially all of the surfaces of the particles of said particulate material are covered with said binder to form a mixture;

(2) forming said mixture into the desired configuration and causing said binder to be hardened by cooling;
(3) and removing said binder from said configuration prior to firing same by returning the binder to its liquid state and thereafter exposing said liquified binder to a leaching agent while said binder is liquified at a temperature above the flow point of said binder and causing said binder and leaching agent to flow from said configuration, whereby the latter can be fired free of said binder.

49. The combination recited in claim 48, wherein said leaching agent is applied as a vapor.

50. The product of the process of claim 1.
51. The product of the process of claim 2.
52. The product of the process of claim 20.
53. The product of the process of claim 21.
54. The product of the process of claim 23.
55. The product of the process of claim 28.
56. The product of the process of claim 32.
57. The product of the process of claim 42.
58. The product of the process of claim 44.
59. The product of the process of claim 45.
60. The product of the process of claim 46.
61. The product of the process of claim 47.
62. The product of the process of claim 48.
63. The product of the process of claim 49.

* * * * *